June 6, 1933.  E. STUBBS  1,912,412

SPLINED SHAFT AND SLEEVE COUPLE

Filed Oct. 16, 1931  3 Sheets-Sheet 1

Inventor
Everard Stubbs

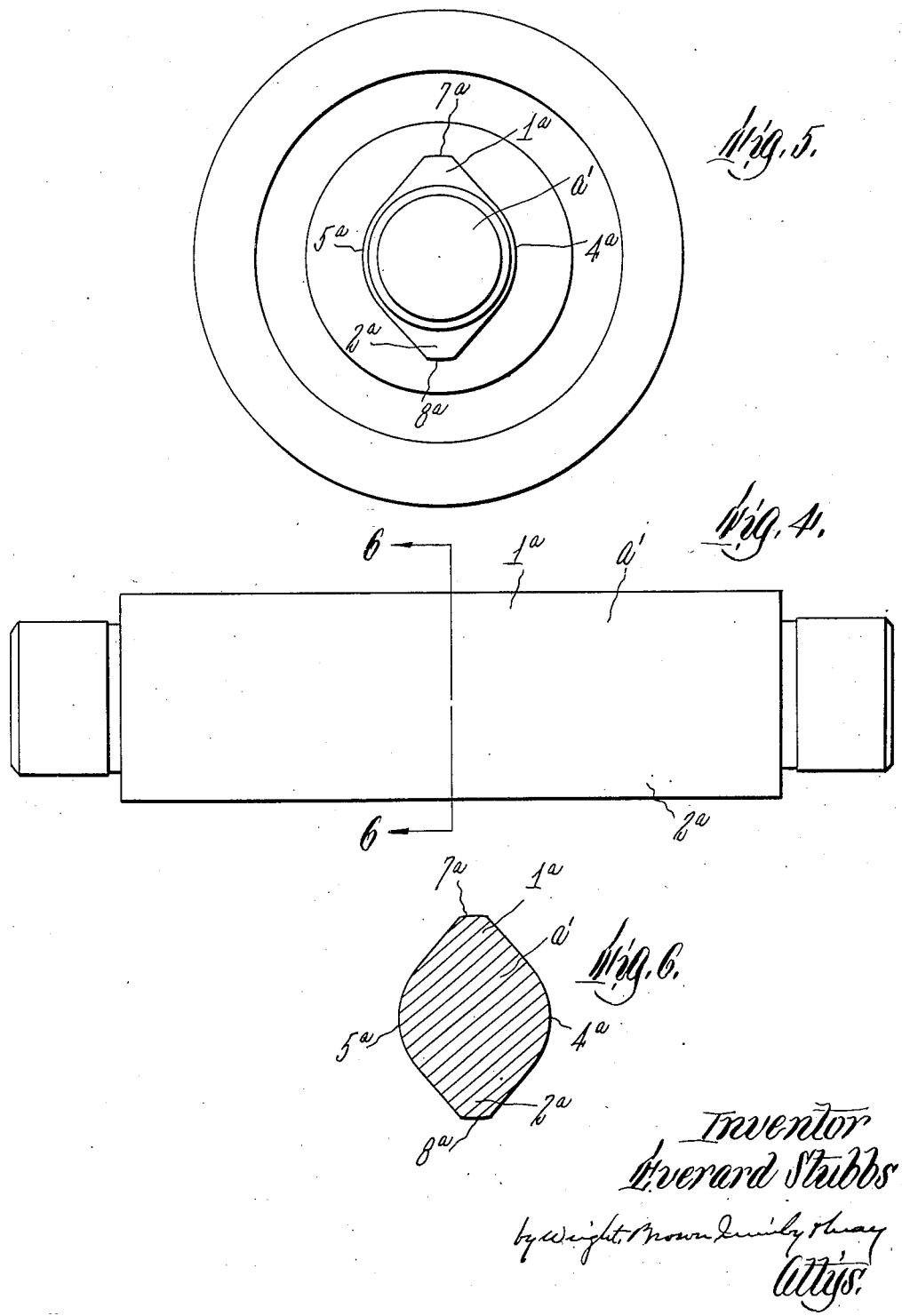

June 6, 1933.  E. STUBBS  1,912,412

SPLINED SHAFT AND SLEEVE COUPLE

Filed Oct. 16, 1931   3 Sheets-Sheet 3

Inventor
Everard Stubbs

Patented June 6, 1933

1,912,412

UNITED STATES PATENT OFFICE

EVERARD STUBBS, OF SPRINGFIELD, VERMONT

SPLINED SHAFT AND SLEEVE COUPLE

Application filed October 16, 1931. Serial No. 569,257.

The present invention relates to splined shafts and complemental sleeve elements adapted to be mounted on such shaft and to be prevented by the splines thereon from rotating independently. In this specification the term "sleeve element" is a generic term including gear wheels and pinions, other wheels of any character, pulleys, clutch members, couplings, and all other machine elements adapted to be mounted on a shaft so as to drive or be driven by the shaft. In many instances the sleeve element of the present invention is adapted to slide longitudinally on the shaft, or vice versa, but the invention is not limited to such sliding arrangement and includes also combinations in which the sleeve member is fixed in its location on the shaft. Within the group of fixed shaft and sleeve couples are included not only those in which the mating surfaces are of uniform shape and dimensions from end to end, but also those which are tapered in all or any part of their length. The term "spined shaft" is therefore used in this specification in a scope embracing tightly fitting and tapered shafts having torque transmitting lobes, as well as those which are fitted slidingly within their complemental sleeve elements.

The object of the invention is to provide a construction of shaft and mating sleeve which can be produced with great accuracy, so that the members of a sliding couple will fit together without looseness but with perfect freedom, while non-sliding members will fit accurately and tightly, and which at the same time can be made and finished rapidly at low cost by a transverse grinding operation as to the shaft and grinding and milling operations, or by broaching, or cutting by a gear shaping machine, as to the sleeve element.

One particular and extensive field of use which the invention is designed to serve, although not restricted thereto, is for the splined shafts and sliding gears of automobile transmission mechanisms; wherefore I will describe its novel characteristics and explain its utility with reference particularly to that illustrative use.

The automobile industry has developed a form of transmission splined shaft having a plurality of integral longitudinal splines or ribs equally spaced angularly about the axis of the shaft, which are radial and have sides parallel to the central radius of the spline, the surface of the shaft between such splines being cylindrical and making sharp reentrant angles with the sides of the spline. The gears to mate with such shafts have cylindrical holes and an equal number of correspondingly arranged keyways. The production of such splined shafts and gears is a difficult problem, the difficulty of which has increased with the more insistent demands of the public and automobile manufacturers for quiet running and durable gearing. Inaccuracy in the fitting of the mating parts allows backlash between the splines and the gear, or transverse movement and rocking of the gear on the shaft, or both, with production of noise, and more or less rapid wear of contacting surfaces and deformation otherwise of the engaging parts. But to obtain an accurate fit, not only must the diameter of the shaft between the splines be accurate, but also the spacing and width of the splines must be correct within narrow limits of tolerance. The hole and keyways in the gear must be equally accurate in dimensions and spacing.

Such shafts are finished to the utmost practicable accuracy by grinding with the use of a formed grinding wheel arranged to operate in an axial plane of the shaft, rotating about an axis transverse to the axis of the shaft and traveling lengthwise of the shaft in its operation, and provided with a concave central zone conforming to the cylindrical curvature of the shaft, and conical zones at the sides conforming in their inclinations and distance apart to the nearer sides of two adjacent splines. That is, the grinding wheel enters the groove between two splines and acts at the same time on the adjacent sides of two splines and the intermediate cylindrical segment of the shaft. After each groove has been thus ground, the shaft must be indexed through a partial rotation to bring the next groove into grinding position, repeatedly, until all have been ground. The maintenance of such grinding wheels in true and accurate shape and in good cutting condition is difficult and expensive; while the failure to maintain them in this condition results in serious inaccuracies in the finished shafts, such as lack of truth in curvature or diameter of the cylindrical part, too great or too little width in the splines, lack of parallelism of the opposite sides of a spline to one another and to the radial plane of the spline, etc. And the gears are likewise difficult to make accurately for, while the grinding of a true and sufficiently accurate central hole is relatively simple, the cutting of keyways accurate in width, concentric with the hole and correct in spacing is not. They involve difficult problems and expensive practices in spacing or indexing, and upkeep of tools. When such gears are heat treated after being cut, as is frequently done, they are liable to be distorted in a manner which necessitates regrinding of the hole and prevents accurate centering of the reground hole with the center about which the keyways are arranged.

In the field of tapered shafts, the only practicable means for torque transmission has been inserted keys. Although it has been proposed to construct tapered shafts with integral lugs or splines, the mechanical difficulties and expense of doing so have been so great as to prohibit their use in practice.

My object and accomplishment has been to avoid the difficulties and expense above mentioned by producing a splined shaft and mating sleeve element in which the splined shaft, whether straight or tapered, can be finished by a grinding operation analogous to simple cylindrical grinding; and the hole in the sleeve element may be finished by broaching, if of uniform dimensions from end to end, or by shaping or planing according to a method which I have devised, whether straight or tapered, with control and accurate fitting of the interengaging surfaces of the two elements. In cases where the broaching method may be used, the invention makes possible the employment of a broach which is easier to make accurately in the first place, has stronger teeth, and can be kept in proper cutting order with less expense, and operated with less power, than the broaches heretofore used for finishing the holes in sleeve elements of the prior art.

The invention consists in the new features and characteristics hereinafter described, and in all substantial equivalents thereof, within the scope of the appended claims.

In the drawings,—

Fig. 4 is a side view of an alternative shaft having two lobes or splines and containing the same invention;

Fig. 5 is an end view of the shaft and the mating sleeve element associated therewith;

Fig. 6 is a cross section of the shaft taken on the line 6—6 of Fig. 4;

Like reference characters designate the same parts wherever they occur in all the figures.

I will first describe the straight or cylindrical type of splined shaft and sleeve couple, two embodiments of which are here shown. In using the term "straight" in this connection I have reference to elements which are of the same dimensions and cross section throughout their length, as distinguished from tapered elements; not to the distinction from a longitudinally curved formation.

Figure 2:
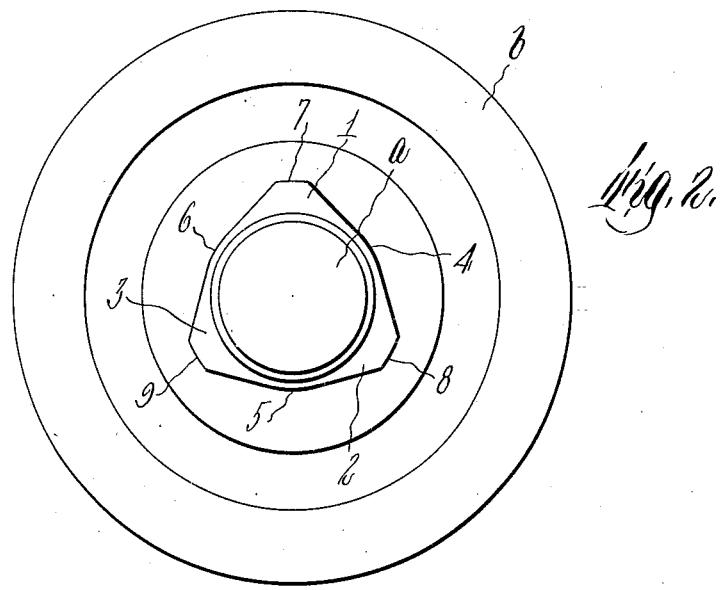
Fig. 2 is an end view of such shaft associated with a complemental sleeve element.
Figure 1:
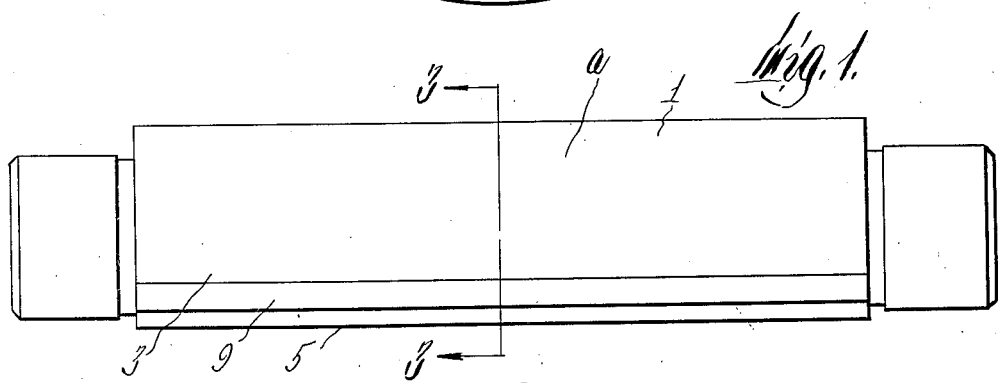
Fig. 1 is a side elevation of a splined shaft having three lobes embodying this invention.
Figure 3:
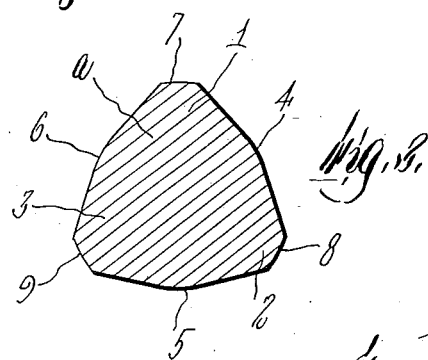
Fig. 3 is a cross section of the shaft taken on line 3—3 of Fig. 1.

The shaft $a$ shown in Figs. 1, 2 and 3, has three lobes, 1, 2 and 3, respectively, and intermediate cylindrical segments 4, 5 and 6, which are preferably equidistant from the axis of the shaft, and preferably also concentric with such axis. The lobes correspond in function with the splines of a multi-splined shaft, and are called splines for the purposes of this specification; but they differ structurally from the ordinary splines of the prior art in that their sides are tangent to the respectively adjacent intermediate segments, and converge toward one another outwardly. In the specific illustration here shown such lobes or splines are identical with one another in form and dimensions, and are equally spaced angularly about the axis of the shaft, the cylindrical segments each have an angular extent of approximately 30°, and the sides of each lobe make an angle of approximately 90° with one another; but these values may be varied more or less within the scope of the invention. The outer extremities of the splines are bounded by surfaces 7, 8 and 9, respectively, which, like the intermediate segments, are preferably equidistant from and concentric with the axis of the shaft, and therefore are equal to one another in width. These external cylindrical surfaces are an important factor of the invention in that they provide bearing surfaces, the positions, dimensions and form of which can be accurately determined and controlled, by which the complemental sleeve element is centered and positioned. They are the primary and main centering surfaces of the shaft.

The complemental sleeve element is shown at $b$ in Fig. 2. It is here shown as a circular disk, which may be taken to represent a gear or pinion, shaft coupling, pulley, wheel, or sleeve of any other character. It is provided with a central hole of the same form as the cross section of the shaft and of dimensions adapting it to receive the shaft. In the case of a sliding gear or clutch member, the hole is made large enough to permit of free sliding movement without backlash or freedom to rock longitudinally. It is mechanically feasible to make such a hole with a close sliding fit, not only on the cylindrical segments 4, 5 and 6 of the shaft, but also on the tops and sides of the lobes, by methods and tools of simpler and less expensive character than those heretofore employed in forming keyways for splined shafts.

While variations within limits from the values hereinbefore stated are permissible, such values are preferred because they give sufficient cylindrical bearing (in this instance six cylindrical surfaces equally distributed about the axis of the shaft) for centering and positioning the sleeve element on the shaft cause the splines to project from the shaft sufficiently for positive driving effect and, at the same time, make the sides of the splines sufficiently steep to avoid binding in the sleeve element, and to permit sliding of the one element relatively to the other when used in situations which require such sliding to take place.

It is important that there be cylindrical segments between the lobes or splines, and that the sides of the lobes be tangent to such cylindrical segments. In thus using the term "tangent", I do not mean to imply that the sides of the lobes must be perfectly plane surfaces, or straight lines in cross section, but only that they should merge smoothly with the cylindrical segments. Some variation from the plane formation of these surfaces is possible in the direction of either convexity or concavity provided that the sides are neither so much convex as to be liable to cause binding of a sliding gear element or to apply to great a bursting stress in the gear or other sleeve element, nor so much concave as to prevent finishing of the shaft by methods of cylindrical grinding. Within these limits, the cylindrical segments may have wider or narrower angular extent and the sides of the lobes may be more or less steeply inclined. The cylindrical segments are necessary in order to provide bearing surfaces, the diameter and fit of which in the sleeve elements can be readily controlled, intermediate the bearing areas provided by the outer surfaces of the lobes.

These segments and the side faces of the lobes collectively form intermediate surfaces which intersect the arcs bounding the extremities of the lobes and, as a whole, are substantially convex, while being at all points less distant from the axis of the shaft than are the outer or top surfaces of the lobes. I use the term "substantially convex" in this connection as meaning, not that the said intermediate surfaces are necessarily convex at all points, but that, notwithstanding the flat formation of the sides of the lobes shown in the drawing, the surface from the tip of one lobe to the tip of the next is essentially convex as a whole. Such convexity enables the shaft to be shaped and finished by methods of cylindrical grinding, as presently described, which is not possible with splined shafts of the types heretofore known.

In finishing the shaft, it is rotated about its longitudinal axis in contact with the circumference of a grinding wheel, which is rotated at the same time about an axis which may be either parallel or inclined to the axis of the shaft. If arranged on an inclined axis, the grinding wheel is preferably made conical in form in such degree that the side which acts on the shaft is parallel to the axis of the latter. In order to take care of the non-concentric surfaces of the shaft, I may use either of two methods; that is, either provide a grinding wheel, the surface of which is conjugate to the surface of the work, in which case the wheel and work are rotated about axes at an invariable distance apart, or I may rotate one of them about a fixed axis and mount the other on a swing frame or other movable carriage which is caused to advance and recede as the grinding wheel acts on lower or higher parts of the surface, respectively. In either case, the finishing operation is rapidly performed and accuracy of dimensions is easily maintained, and the multiple driving surfaces of the shaft are produced without any indexing operations. The dressing of the grinding wheel to keep its surface true and in good cutting order is a simple matter compared with the dressing of the complex formed wheels heretofore used for grinding splined shafts.

The hole for the shaft in the complemental sleeve element, after having been first cut to approximate size and form by drilling and milling or shaping, may be finished to accurate form and dimensions by a cutting or burnishing broach; and in the broaching operation, all of the ways for the lobes of the shaft may be finished simultaneously by a single broach having the same form as the shaft and generated by the same character of grinding action. The cylindrical portion of the hole may be ground, after hardening, as in the present practice. Thus a substantially accurate fit between the shaft and the sleeve element may be obtained with a minimum of difficulty and expense, and with a substantial advantage in these particulars over the prior practice. The cylindrical segments of the shaft, the outer surfaces or tops of the lobes, and the complemental surfaces of the sleeve element are thus readily fitted together with sufficient accuracy to prevent longitudinal rocking, and the sides of the lobes of the shaft and ways in the sleeve element are likewise so fitted as to avoid looseness and backlash in driving. The sources of noise due to loose splined shafts and gears are thus made avoidable at a minimum of difficulty and expense.

The cylindrical outer surfaces of the lobes, which are concentric or coaxial with the shaft as a whole are equally controllable with the intermediate segments 4, 5 and 6 as to accuracy of diameter, and are of perhaps greater importance than said segments, on account of their longer radius, in furnishing centering means for the sleeve member on the shaft. The characteristics here shown of concentric bearing surfaces on the most protuberant parts of the shaft, combined with non-concentric driving surfaces within the continued circumference of such bearing surfaces is, as I believe, an entirely new feature in the art, which, because of its ease of machining, makes for accuracy of fitting in a complemental sleeve member and absence of looseness, noise and wear when combined with a sliding gear or the like.

The conditions previously described limit the number of splines or lobes with which the shaft may be provided to four at the most; but so large a number as four is impracticable, although not impossible, because the necessity of the cylindrical formation between lobes requires the sides of each spline in that case to make an angle of more than 90° with each other, thereby introducing liability of binding, and narrowly limiting the extent to which the lobes can project. Hence three lobes is the largest practicable number.

However the shaft may be made with one or two lobes, and in Figs. 4, 5, and 6, I have shown a form of the invention in which there are two lobes. The shaft here is designated $a'$, the sleeve element $b'$, the lobes of the shaft $1a$ and $2a$, and the intermediate cylindrical segments $4a$ and $5a$, and the outer bearing surfaces $7a$ and $8a$. In this case also the shaft and sleeve element may be made by the same method and with the same quality of accuracy previously described. The less number of lobes, however, permits the cylindrical segments to have a wider angular extent and permits a greater variation in the lateral projection of the lobes and the included angle between their bounding sides. In this case also, the sides of the lobes are tangent to the cylindrical surfaces within the definition previously given. Like conditions hold when the shaft is made with a single lobe.

It is to be understood, of course, that shafts of the character herein described are adapted and intended for use as either driving or driven shafts. That is, such a shaft may either rotate, or be rotated by, its complemental sleeve element. In either case, whether it transmits torque as a driver to the sleeve element or receives torque from the sleeve element for transmission elsewhere, it is a torque-transmitting shaft in which rotational effort is exerted through its lobes, splines or keys.

Figure 7:
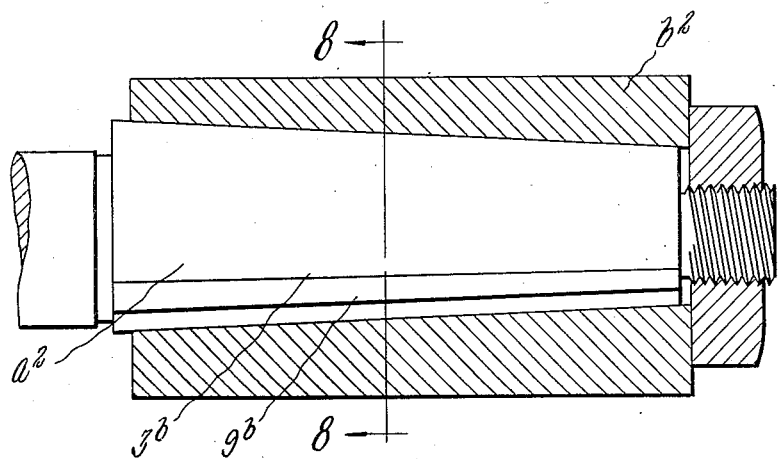
Fig. 7 shows in side elevation a tapered splined shaft, and in section a complemental sleeve element, embodying the invention.
Figure 8:
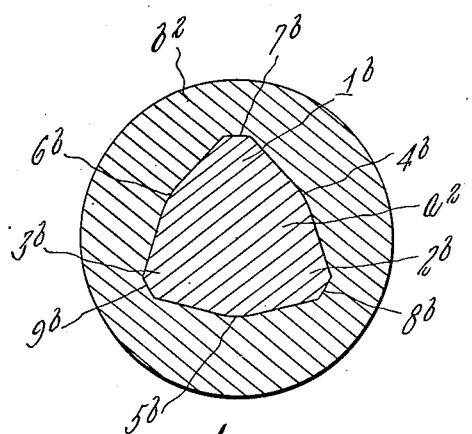
Fig. 8 is a cross section on line 8—8 of Fig. 7.

The couple shown in Figs. 7 and 8 is like that shown in Figs. 1, 2 and 3 with the single exception that the shaft $a^2$ and the complemental hole in the sleeve element $b^2$ are tapered. Then the intermediate segments $4b$, $5b$ and $6b$, and also the outer bearing surfaces $7b$, $8b$ and $9b$ of the splines are conical segments instead of cylindrical. This form of shaft, equally with the straight shaft, can be finished by cylindrical grinding as before described, with the use either of a cylindrical faced grinding wheel on an axis inclined to the axis of the shaft, or a cone faced wheel on an axis parallel to the shaft. The hole in the sleeve element may be finished so as to fit without backlash on the shaft, and at the same quickly and inexpensively by the method and machine disclosed in my pending application Serial No. 367,773, filed June 1, 1929.

Tapered couples of the character last described are useful for connecting wheels and the like on the ends of shafts, such as the driving road wheels on the driving axles of an automobile. The accuracy of fit and the powerful torque transmitting construction of this tapered couple gives results in use far superior to the commonly used device of a conical axle end and wheel bore with an inserted key or feather. The backlash, wear and liability of shearing the teeth, frequently occurring in the common practice, are wholly avoided here.

This application is a continuation as to all common subject matter of my pending application entitled Splined shaft and sleeve couple, filed August 27, 1927, Seriel No. 215,983.

What I claim and desire to secure by Letters Patent is:

1. A shaft having torque transmitting lobes or splines and intermediate surfaces less distant than the outer extremities of the lobes from the axis of the shaft; said outer extremities having curved bounding surfaces concentric with said axis and the sides of each lobe being inclined to one another divergently from said extremities and tangent to said intermediate surfaces.

2. A power shaft for driving cooperation with a complemental sleeve member having a lobe or spline projecting from its side, and curved segmental portions, coaxial with the shaft, at each side of said lobe; the side faces of the lobe being tangent to said curved portions.

3. A splined shaft having a plurality of longitudinally extending laterally projecting lobes, and intermediate segments, the outer faces of the lobes and the intermediate segments being curved concentrically with the axis of the shaft and connected by sides which are substantially tangent to said segments.

4. A splined shaft having substantially cylindrical bearing surfaces of relatively short radius, intermediate substantially cylindrical bearing surfaces of relatively longer radius, all concentric with the shaft, and non-concentric surfaces substantially tangent to said short radius surfaces arranged to form the sides of outwardly projecting lobes, the outer boundaries of which are the said surfaces of longer radius.

5. A splined shaft having a plurality of longitudinally extending laterally projecting lobes, and intermediate cylindrical segments, the sides of said lobes being tangent to said segments.

6. A splined shaft having a plurality of longitudinally extending laterally projecting lobes, and intermediate cylindrical segments, the sides of said lobes being plane surfaces tangent to said cylindrical segments.

7. A splined shaft having conical surfaces of relatively short radius, intermediate conical surfaces of relatively longer radius, all coaxial, with the shaft, and non-concentric surfaces tangent to said short radius surfaces, arranged to form outwardly convergent sides of outwardly projecting lobes, the outer boundaries of which are the said surfaces of longer radius.

8. A splined shaft having a plurality of longitudinally extending laterally projecting lobes, and intermediate segments coaxial with the shaft and tangent to the sides of the lobes; the sides and outer extremities of the lobes, and the intermediate segments, being all correspondingly tapered.

9. A tapered splined shaft having a plurality of lobes, the outer extremities of which are coaxial conical surfaces converging in the same direction with the shaft, the sides of which are convergently inclined both radially and longitudinally of the shaft, and the shaft having conical segments intermediate the splines which converge longitudinally in the same direction as the outer bounding faces of the splines and are tangent each to the contiguous side faces of the adjacent splines.

10. A torque transmitting shaft and sleeve couple consisting of a shaft having a longitudinal lobe projecting from its side, and curved segmental portions coaxial with the shaft at each side of said lobe, the bounding surfaces of such lobe being tangent to said segmental portions; and a sleeve having a hole complemental to the segmental portions of the shaft and a groove with bounding walls complemental to the sides of said lobe.

11. A torque transmitting shaft and sleeve couple comprising a shaft having a plurality of lobes and intermediate convex curved segments less distant than the outer extremities of the lobes from the axis of the shaft, the sides of said lobes being tangent to said segments; and a sleeve element having a hole complemental to said segments and a plurality of ways or grooves with inclined walls complemental to the respective lobes of the shaft.

12. A torque transmitting shaft and sleeve couple comprising a shaft having torque transmitting lobes or splines and intermediate surfaces less distant than the outer extremities of the lobes from the axis of the shaft, said outer extremities having curved bounding surfaces concentric with said axis and the contiguous sides of each two adjacent lobes merging smoothly with the intermediate surface in a substantially convex formation; combined with a sleeve element having a hole or passage, the bounding surfaces of which are complemental in substantially all respects to the before described surfaces of said shaft and its lobes.

13. A splined shaft and sleeve couple comprising a shaft having a plurality of lobes and intermediate cylindrical segments, the sides of said lobes being tangent to said segments, and a sleeve element having a cylindrical hole complemental to said segments, and a plurality of ways or grooves with inclined walls complemental to the respective lobes of the shaft.

14. A splined shaft and gear couple comprising a shaft having longitudinal ribs and intermediate cylindrical segments, the outer sides of which ribs have bearing surfaces and the sides of the ribs extending to tangent merger with said cylindrical surfaces; and the gear having a complemental hole with bearing surfaces adapted to engage such cylindrical surfaces and outer faces of the ribs, and with inclined surfaces making obtuse angles with the said bearing surfaces and adapted to receive or transmit torque from or to the ribs.

15. A splined shaft and sleeve couple comprising a shaft having longitudinal ribs and intermediate segments, said segments and the outer bounding faces of the ribs being coaxial conical surfaces and the sides of the ribs being tangent to the intermediate surfaces; and the sleeve having a complemental hole with conical bearing surfaces adapted to engage the respective conical surfaces of the shaft, and having also inclined surfaces arranged correspondingly to the sides of the ribs of the shaft.

16. A sleeve element having a passage which includes separated coaxial curved segments and a groove intermediate said segments formed with non-parallel walls tangent to the respectively adjacent segments.

17. A sleeve element having a passage which includes equally spaced coaxial cylindrical segments of relatively longer radius, and equally spaced coaxial cylindrical segments of relatively shorter radius each midway between two of the segments of longer radius, and inclined surfaces tangent to the several segments of shorter radius and relatively arranged to form the side faces of grooves of which the segments of longer radius are the respective outer boundaries.

18. A sleeve element having a tapered passage bounded by alternate conical and substantially plane surfaces, said substantially plane surfaces being arranged in pairs, and the members of each pair being inclined convergently outward from the axis of the passage, certain of said conical surfaces being arranged to form the outer boundaries of grooves bounded by each pair of plane surfaces, and the remaining conical surfaces being each tangent to the contiguous sides of two grooves.

In testimony whereof I have affixed my signature.

EVERARD STUBBS.